Figure 10:
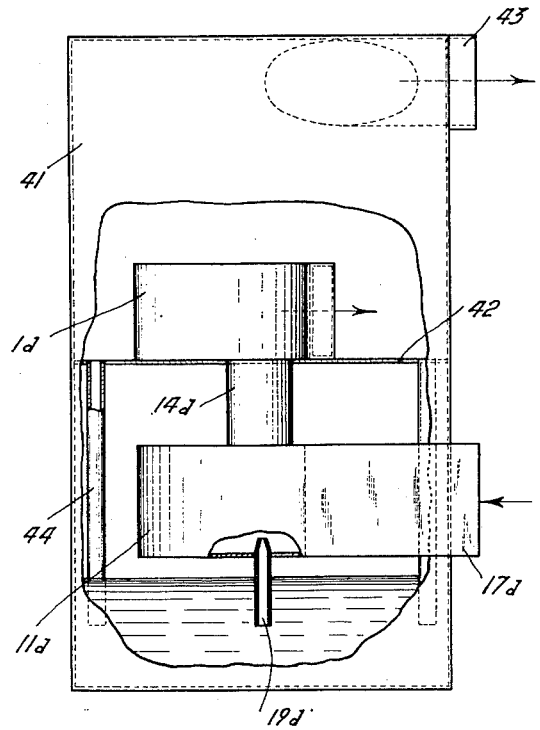

May 1, 1962 M. M. P. R. DE LA FOURNIERE 3,031,825
INSTALLATIONS AND APPARATUS FOR WASHING, CLEANSING
OR EXTRACTING DUST FROM GASES
Filed June 19, 1958 3 Sheets-Sheet 1
Fig. 1
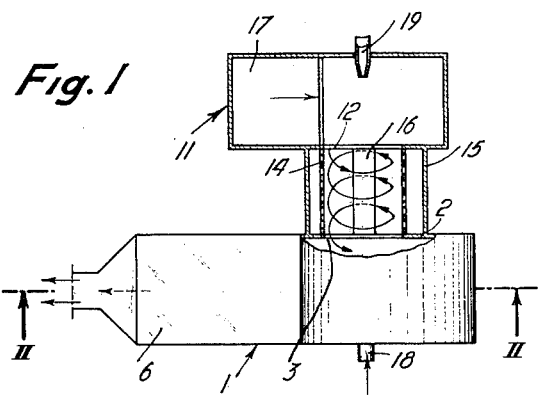
Fig. 3
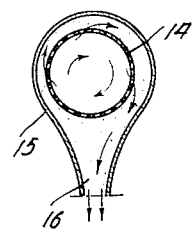
Fig. 2
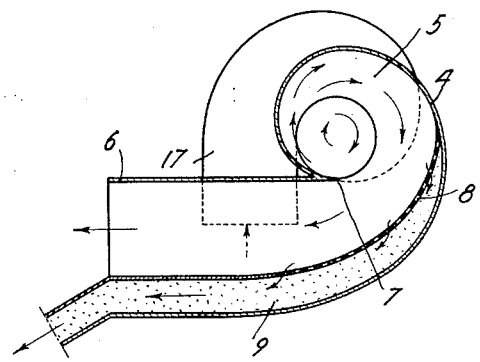
Fig. 5
Fig. 4
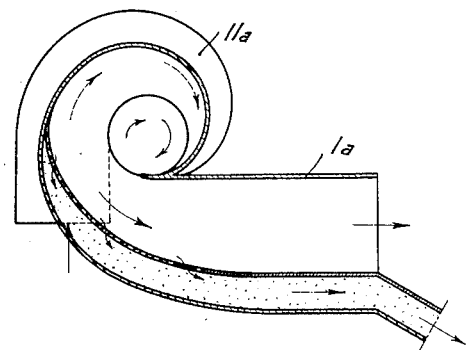
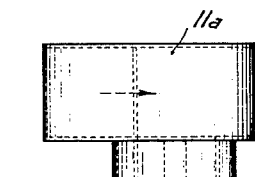
Inventor
M.M.P.R. de la Fourniere
By Blacock Downing Seebold
Attys.

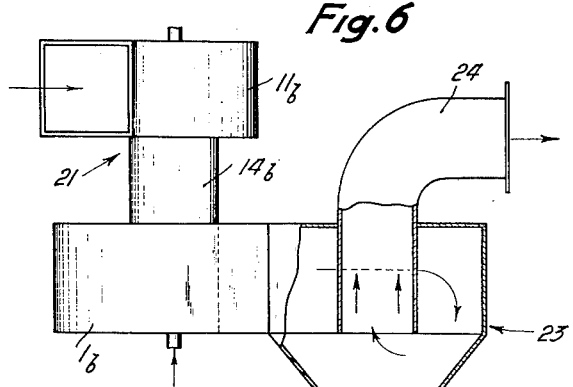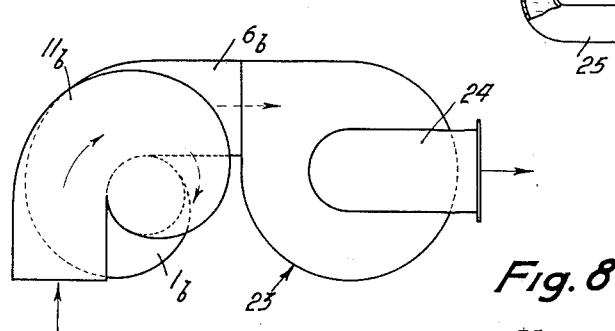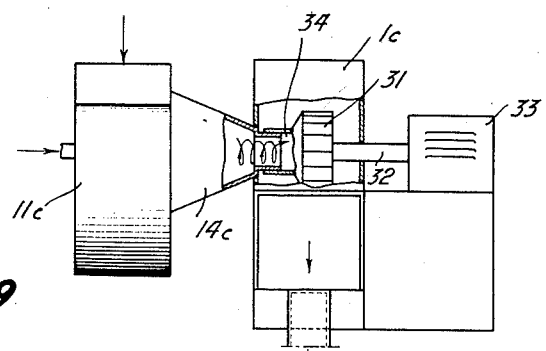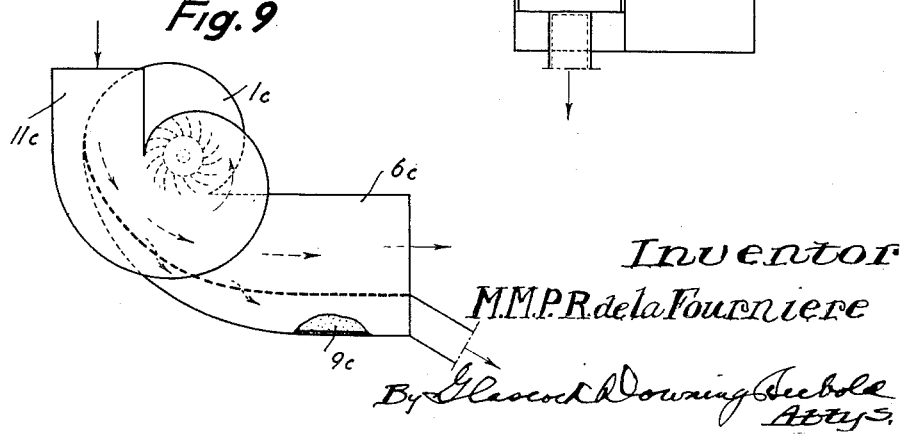

United States Patent Office
3,031,825
Patented May 1, 1962

3,031,825
INSTALLATIONS AND APPARATUS FOR WASHING, CLEANSING OR EXTRACTING DUST FROM GASES
Marc Marie Paul René de la Fourniere, 3 Rue Henri-Rochefort, Paris, France
Filed June 19, 1958, Ser. No. 743,172
Claims priority, application France June 21, 1957
9 Claims. (Cl. 55—236)

The invention relates in a general manner to the cleansing of gases whether it concerns merely the extraction of dust therefrom, namely the extraction of solid particles travelling along therewith, or the extraction of liquid or gaseous particles travelling along with the gas alone or concurrently with the solid particles.

In the extraction of dust from a gaseous stream either by dry or wet means, it is known to produce by centrifugal action a separation of the dust carried by the gas stream, such as by causing the latter to assume a whirling motion.

An object of the present invention is to obtain the maximum degree of dust extraction while restricting to a minimum the loss of aerodynamic pressure as well as, in the case of treating by wet means, the flow of liquid and losses of hydrodynamic pressure and the total energy expended for the treatment.

Another object is to carry out the treatment with apparatus whose size and space consumption are as small as possible.

To achieve these and other objects, the invention provides an apparatus adapted to be traversed by a gaseous stream to be treated and is characterized in that such apparatus comprises a circulation chamber in the form of a volute or spiral, preferably a logarithmic spiral, adapted to be traversed by said stream and whose volute or spiral wall is provided with apertures for the tangential escape of the particles carried along in said stream, the inlet of said chamber being provided by a central aperture in the part of the chamber surrounding the axis of the spiral and the outlet being provided at the widest end of the volute or spiral.

The circulation chamber is adapted to be traversed by a gaseous stream to which there has been previously imparted a motion of rotation about itself, namely about its flow axis, or which has been previously charged with particles of a suitable treating fluid or which both undergoes such motion and is charged with such particles. In any case, the circulation chamber is adapted to be used not alone but in combination with means adapted to impart such motion to the gaseous stream or means to charge the stream with said particles or with both these means.

When a motion of rotation about its flow axis has been imparted to the gaseous stream, it is advantageous that the circulation chamber be disposed so as to present to the stream of air entering the chamber, cross-sections which successively increase in the direction of its rotation so as to progressively slow down its speed of rotation. In this way, there is obtained a flow having minimum pressure loss. However, some advantage may be gained in some cases, for the purpose of obtaining a disorderly whirling motion at the expense of higher pressure loss, in disposing the circulation chamber in such manner that the gaseous stream enters such chamber by rotating in the direction of the decreasing cross-sections of the volute or spiral.

In some cases, advantage may also be gained in increasing the energy of the gaseous stream circulating in the circulation chamber by disposing within the chamber a bladed wheel and this wheel alone could cause the circulation of the gaseous stream.

Further, in the case of a gaseous stream undergoing a motion of rotation about itself prior to entering the circulation chamber, it is advantageous to provide on the upstream side of the chamber, relative to the direction of flow of the gaseous stream, a pipe of revolution which is traversed by said stream in rotational motion and which has a wall which is apertured in such manner as to permit the tangential escape of the particles carried along in the gaseous stream.

Preferably, the means for imparting to the gaseous stream a motion of rotation about itself comprise, as known per se, a chamber which has a cross-sectional shape in the form of a volute or spiral, the widest part of which constitutes the inlet aperture for the gaseous stream, and is arranged in such manner as to result in a flow of the "whirling-shaft" type, the exit of the stream being by way of an aperture substantially coaxial with the spiral. In this way, there is obtained an apparatus having minimum loss of aerodynamic pressure.

In another embodiment, the means for imparting a motion of rotation about itself to the gaseous stream prior to entering the separation chamber, or the pre-separation pipe, or both, are grouped with the volute or spiral separating chamber and preferably co-axially thereto, so as to constitute a unitary apparatus.

In the case of treating by wet means, means are provided which communicate preferably with the vicinity of the flow axis of the gaseous stream and by means of which it is possible to inject in at least one transverse portion of the gaseous stream between its exit from the means imparting thereto its motion of rotation about itself and its exit from the separation chamber, and preferably in a plurality of portions spaced from one another along the flow axis, any suitable treating fluid, such as, for example, water, stream or dense gas.

Further features and objects of the invention will be apparent from the ensuing description of several embodiments of the invention, with reference to the accompanying drawings, to which the invention is in no way restricted.

Figure 11:
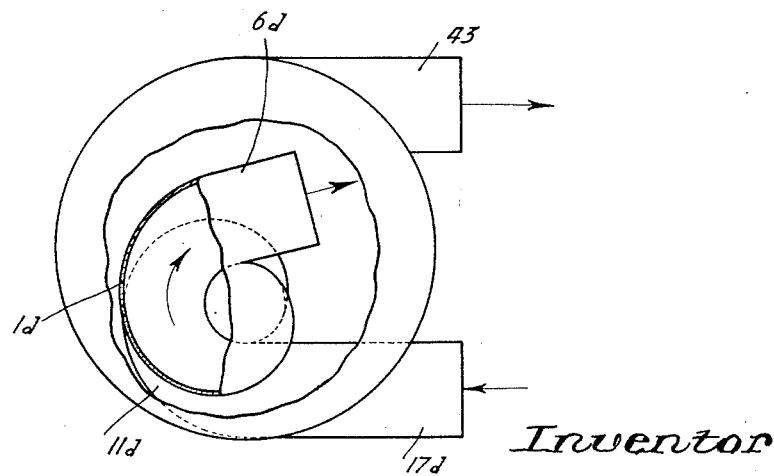

In the drawings:
FIGURE 1 is an elevational view partly broken away and partly in cross-section illustrating an embodiment for the present invention;
FIG. 2 is a sectional view taken along line II—II of FIG. 1;
FIG. 3 is a sectional view taken through the connecting portion of the upper and lower chambers of FIG. 1;
FIG. 4 is a plan view similar to FIG. 1 showing a modified form of the apparatus.
FIG. 5 is a vertical sectional view taken along line V—V of FIG. 4;
FIG. 6 is an elevational view partly broken away and partly in cross-section of another modification of the apparatus;
FIG. 7 is a plan view of the apparatus shown in FIG 6;
FIG. 8 is an elevational view partly broken away and partly in cross-section of another modification;
FIG. 9 is a side elevational view partly broken away of the apparatus shown in FIG. 8, and
FIGS. 10 and 11 are respectively an elevational view and a plan view partly broken away and partly in cross-section of a cleansing apparatus using wet means, and the liquid utilized circulating in a closed circuit.

In the embodiment shown in FIGS. 1–3, the apparatus comprises a particle-extracting or separating chamber generally indicated by the reference numeral 1 and comprising a side wall 2 in which is formed a circular inlet aperture 3 and a second wall 4, the cross-sections of which in planes perpendicular to the axis of the aperture 3 are formed by logarithmic or substantially logarithmic spirals. The spiralled cavity 5 of the chamber 1 communicates with the exterior through a pipe 6 so shaped that its wall lines up substantially tangentially with said second wall 4, with the connection point nearest the axis constituting a point of retrogression 7 (FIG. 2). At a certain distance from the rotrogression point 7 the wall 4 is combined with a perforated wall 8 which is connected thereto tangentially and recedes therefrom progressively as the spiral wall recedes from the axis. The perforated wall 8 is extended within the pipe 6 by an imperforate portion and the partition thus formed defines with the wall 4 of the chamber, a pipe 9 which communicates with the exterior. A second chamber 11, constructed in the same manner as the chamber 1, but without an inner partition 8, has its circular aperture 12 connected by an apertured pipe 14 to the aperture 3 of the chamber 1. The pipe 14 is surrounded by a wall or sleeve 15 which is spaced from the pipe and below the pipe 14 is substantially the shape of a hopper or funnel 16 which terminates in an open lower end.

The apparatus operates in the following manner:

The fluid to cleanse enters the chamber 11 through a tangential pipe 17 and leaves this chamber through the aperture 12 in a whirling stream having a high central vacuum. Due to this motion, the solid or liquid particles carried along by the whirling stream of air are subjected to centrifugal action, pass through the perforated wall of the pipe 14 and fall into the hopper 16 and thence into any suitable collecting vessel or evacuating means (not shown). The stream of fluid thereafter passes from the pipe 14 through the inlet 3 into the chamber 1 in which the particles continue to be subjected to centrifugal action, pass through the perforated wall 8 and accumulate in the pipe 9, from which the particles fall and are collected or evacuated in any suitable manner. The stream of cleansed fluid issues from the pipe 6. This stream no longer has a whirling motion due to the fact that, since the spiral wall of the chamber 1 is developed in turning in a direction opposite to that of the development of the second wall of the chamber 11, the whirling motion created by the chamber 11 is neutralized by the opposite action of the chamber 1.

The flow is in effect always in the same direction in the chamber 11 as well as in the chamber 1. However, in the chamber 11, the entering stream is not whirling, and circulates while approaching the axis of the spiral, and by virtue thereof assumes a whirling motion while it circulates in the chamber 1, swerving away from the axis of the spiral thus losing progressively its whirling motion, and leaving such chamber in a current whose flow velocity is the same at each point throughout the flow cross-section.

The above-described apparatus could be, if desired, simplified by eliminating the perforated pipe 14 and the sleeve 15, so that the two chambers 11 and 1 adjoin. In such a situation, the hopper 16 is omitted. This apparatus produces only a humidification of the dust particles which may be eventually separated in a centrifugal separator.

The apparatus furthermore could include for each of the chambers 1 and 11 or for one of these chambers, a pipe 18, 19, respectively, (FIG. 1) disposed on the axis of the chamber and communicating with the interior of the latter. This pipe supplies a cleansing gaseous or liquid fluid or a washing liquid. Due to the high central vacuum the fluid entering the chambers 11 and 1 by way of the pipes 18—19, respectively, is intimately mixed therein with the fluid to be cleansed and, in the case of a liquid cleansing medium, the latter is very finely pulverized and mixed with the fluid to be cleansed. The liquid particles thus pulverized are thereafter eliminated in passing through the perforated partitions under the effect of centrifugal force produced by the whirling of this stream.

In the modification shown in FIGS. 4 and 5, the apparatus is constructed in the same manner as the apparatus described hereinbefore, except that the spiral walls of the two chambers 1a and 11a recede from the axis in turning in the same direction (FIG. 5). In this case the whirling motion of the stream is not progressively neutralized as in the apparatus shown in FIGS. 1 to 3 and eddies are formed in the chamber 1a.

The apparatus 21 shown in FIG. 6 comprises two chambers 1b and 11b having a spiral contour and respectively similar to the chambers 1 and 11 shown in FIGS. 1-3, except the pipe 14b which interconnects the circular apertures has an imperforate wall and a sleeve similar to sleeve 15 (FIG. 1) is omitted.

Futher, the axis common to the two chambers 1b and 11b is vertical with the inlet chamber for the stream of fluid to be cleansed being located above the chamber 11b for this stream. The outlet pipe 6b of the chamber 11b is connected to the inlet end of a cyclone 23 having a central outlet pipe 24 at its upper portion.

In this arrangement, the stream of air to be cleansed charged in the chambers 1b and 11b with particles of cleansing liquid, as explained hereinbefore in FIGS. 1-3, enters the cyclone 23 where, as a result of centrifugal action, these liquid particles and solid particles which could be carried along by the stream of fluid are separated and accumulate in the bottom of the cyclone, from which they are evacuated by way of the lower aperture and the evacuating pipe 25, whereas the cleansed stream issues from the outlet pipe 24.

It will be understood that as in the previously described apparatus, the two chambers 1b and 11b could have spiral contours which recede from the axis.

The apparatus shown in FIGS. 8 and 9 comprises two chambers 1c and 11c constructed and grouped in the same manner as in FIGS. 1 to 3, except that the inlet pipe of the chamber 11c is directed upwardly instead of downwardly. Further, there is disposed in the outlet chamber 1c a bladed wheel 31 carried by a shaft 32 driven by a motor 33 supported on a stand rigid with the chamber 1c. The axial inlet 34 in the wheel 31 communicates with the pipe 14c which interconnects the circular apertures of the chambers 11c and 1c. The direction of rotation of the wheel 31 could be the same as that of the gyration of the whirling stream which passes from the chamber 11c, through the pipe 14c and enters the wheel 31 or, on the other hand, could be opposite to this direction of gyration. In the latter case, there is produced a sudden reversal in the direction of rotation of the stream which increases the intimacy of the mixture of the liquid or gaseous cleansing fluid with the stream of fluid to be cleansed. In both cases, the rotation of the wheel at high speed accentuates the centrifugal action and separation of the solid or liquid particles, which escape by way of pipe 9c (FIG. 9).

In the arrangement shown in FIGS. 10 and 11, an assembly of two spiralled chambers 1d and 11d, constructed in the same manner as the chambers 1 and 11 in FIGS. 1-3, with the circular apertures of these chambers being interconnected by a pipe 14d, is disposed inside a casing or housing 41. The common axis of the chambers is vertical and the chamber 11d is disposed above and rests on a horizontal partition 42 which divides the interior of the casing 41 into two superimposed compartments. The inlet pipe 17d for the chamber 11d communicates exteriorly of the casing 41 whereas the outlet pipe 14d of the chamber 1d communicates with the interior of the upper compartment of the casing. A tangential outlet pipe 43 is disposed at the upper part of the casing 41. The lower part of the lower compartment of the casing 41 contains a reserve of cleansing liquid in which the lower end of a tube or pipe 19d is immersed, with the tube being on the axis of chamber 11d and communicating with and entering the interior of the chamber 11d. Tubes or pipes 44 fixed at their upper part to the horizontal partition 42 extend through the latter, and have their lower ends immersed in the liquid in the lower compartment. In this arrangement, the apparatus operates in the following manner:

The stream of fluid to be cleansed enters by way of the pipe 17d, assumes a whirling motion in the chamber 11d, and passes by way of the pipe 14d into the upper chamber 1d whence it issues by way of the pipe 6d into the upper compartment of the casing 41, where it whirls and from which it escapes through the upper tangential pipe 43. As a result of the vacuum prevailing at the center of the chamber 11d, the liquid contained in the lower part of the lower compartment of the casing 41 rises in the tube 19d and is pulverized in the chamber 11d, from which it passes, with the stream of fluid to be cleansed, into the separation chamber 1d and from which chamber into the upper compartment of the casing 41, wherein the particles of pulverized liquid and the solid particles carried along by the stream of fluid are subjected to centrifugal action against the wall, flow downwardly along the latter and then through the tubes 44 into the lower compartment on the bottom of which the solid particles are decanted, whereas the cleansing liquid is once more drawn through the tube 19d and therefore circulates in a closed circuit.

Means not shown in the drawings are of course provided for emptying the lower compartment and renewing the cleansing liquid.

Although specific embodiments of the invention have been described, many modifications and changes may be made therein without departing from the scope of the invention as defined in the appended claims.

What I claim is:

1. An apparatus for the treatment of a gas flow including removing non-gaseous particles therefrom, comprising means for successively transforming a translatory flow, said flow transforming means including a gas admission box having two bottom walls and therebetween a side wall having a spiral contour, one of said bottom walls being provided with a circular opening the edge of which extends around the spiral axis of said side wall and serves as gas outlet of the admission box, said box being further provided with an inlet so arranged remotely of said circular outlet that a gas flow entering said admission box through said inlet will flow to said circular outlet spirally inwardly along said side wall, a similar gas discharge box having two bottom walls and therebetween a side wall having a spiral contour, one of said bottom walls being provided with a circular opening the edge of which extends around the spiral axis of said side wall, said box being further provided with an outlet so arranged remotely of said circular opening in the discharge box bottom that a whirl entering said gas discharge box through said circular opening will flow to said outlet spirally outwardly along said side wall, said gas discharge box being connected to said admission box and so arranged relatively thereto that both said boxes communicate together through said circular openings and the gas whirl formed in the admission box enters the discharge box through the circular opening in the bottom thereof and flows therefrom to the discharge box outlet spirally outwardly along the lateral wall thereof, a casing at least partially enclosing said admission box and having liquid therein, duct means within the casing having an outlet end within the admission box and an inlet end below the level of the liquid, a cylindrical shell enclosing the discharge box and its outlet, an outlet for the cylindrical shell, the relative location between the cylindrical shell and the discharge box being such as to provide a whirling motion within the shell of the gas flow issuing from said discharge box, a bottom on said shell located above the level of the liquid, and means establishing communication between the lower part of the cylindrical shell and the interior of said casing.

2. An apparatus for the treatment of a gas flow including removing non-gaseous particles therefrom, comprising means for successively transforming a translatory gas flow into a whirl and this whirl back into a translatory flow, said flow transforming means including a gas admission box having two bottom walls and therebetween a side wall having a spiral contour, one of said bottom walls being provided with a circular opening the edge of which extends around the spiral axis of said side wall and serves as gas outlet of the admission box, said box being further provided with an inlet so arranged remotely of said circular outlet that a gas flow entering said admission box through said inlet will flow to said circular outlet spirally inwardly along said side wall, a similar gas discharge box having two bottom walls and therebetween a side wall having a spiral contour, one of said bottom walls being provided with a circular opening the edge of which extends around the spiral axis of said side wall, said box being further provided with an outlet so arranged remotely of said circular opening in the discharge box bottom that a whirl entering said gas discharge box through said circular opening will flow to said outlet spirally outwardly along said side wall, said gas discharge box being connected to said admission box and so arranged relatively thereto that both said boxes communicate together through said circular openings and the gas whirl formed in the admission box enters the discharge box through the circular opening in the bottom thereof and flows therefrom to the discharge box outlet spirally outwardly along the side wall thereof, a casing at least partially enclosing said admission box and having liquid therein, duct means within the casing having an outlet end within the admission box for supplying a liquid from said casing into said admission box, a cylindrical shell enclosing the discharge box and its outlet, an outlet for the said cylindrical shell, the relative location between the cylindrical shell and the discharge box being such as to provide a whirling motion within the shell with the gas flow issuing from the outlet of said discharge box, and drainage means extending between the lower part of said shell and said casing.

3. Apparatus as in claim 2, wherein the spiral contour of each of said boxes is a logarithmic one.

4. Apparatus as in claim 2, wherein the spiral contour of each of said boxes extends to the perimeter of said circular opening.

5. Apparatus as in claim 2, wherein said discharge box is located in the lower part of said shell and the outlet of the shell is provided at the upper part of the shell.

6. An apparatus as claimed in claim 1, wherein said means establishing communication is provided with an open end located below the level of the liquid in said casing.

7. An apparatus as claimed in claim 1, wherein said shell and casing are combined into a unitary structure.

8. An apparatus as claimed in claim 1, wherein said means establishing communication includes at least one conduit means extending downwardly within said casing and extending through the bottom of said cylindrical shell.

9. An apparatus as claimed in claim 1, wherein said discharge box is supported by the bottom of said cylindrical shell.

References Cited in the file of this patent

UNITED STATES PATENTS

| | | |
|---|---|---|
| 1,888,603 | Mauthe | Nov. 22, 1932 |
| 1,897,370 | Garner | Feb. 14, 1933 |
| 1,952,308 | Bowen | Mar. 27, 1934 |
| 1,955,465 | Lissman | Apr. 17, 1934 |
| 2,487,633 | Breslove, Jr. | Nov. 8, 1949 |